United States Patent Office 3,432,544
Patented Mar. 11, 1969

3,432,544
PROCESS FOR REMOVING FORMIC ACID FROM MIXTURES RICH IN ACETIC ACID
Kurt Sennewald, Knapsack, near Cologne, Heinz Erpenbach, Surth, near Cologne, Wilhelm Vogt, Knapsack, near Cologne, and Herbert Joest, Cologne-Sulz, Germany, assignors to Knapsack Aktiengesellschaft, Knapsack, near Cologne, Germany, a corporation of Germany
No Drawing. Filed Mar. 21, 1967, Ser. No. 624,704
Claims priority, application Germany, Mar. 31, 1966, K 58,884
U.S. Cl. 260—499                        7 Claims
Int. Cl. C07c 67/06

ABSTRACT OF THE DISCLOSURE

A mixture, which is formed of acetic acid and formic acid and which may also contain further organic impurities and water, is freed from the formic acid by decomposition of that acid, at elevated temperature, i.e., by passing the mixture in vapor form over a noble metal, carrier catalyst, the catalyst being formed of palladium, gold and sodium acetate deposited on silicic acid as the carrier.

---

The present invention relates to a process for removing small proportions of formic acid from acetic acid, which may contain further organic impurities or water, wherein the formic acid is catalytically decomposed to carbon dioxide and hydrogen, at elevated temperature.

This is necessary in the case of reactions yielding final products which are formed of mixtures rich in acetic acid and contain formic acid as an undesired byproduct, for example the final products obtained by oxidizing acetaldehyde to produce acetic acid or peracetic acid, or by oxidizing low molecular weight hydrocarbons to produce carboxylic acids of low molecular weight.

Small proportions of formic acid are very difficult to separate from acetic acid by distillation, and attemps have therefore been made with the object of decomposing the formic acid.

As taught in Chemical Abstracts, vol. 34 (1940), p. 5273, formic acid, which is present in admixture with acetic acid, can be decomposed selectively by causing the mixture to flow in vapor form and together with air over a platinum catalyst. This catalyst is known to have a rather limited activity at temperatures lower than 200° C. which, however, increases as the temperature increases. At temperatures higher than 200° C., the formic acid is found to be subject to satisfactory decomposition, but the acetic acid is found simultaneously to undergo undesired decomposition up to an extent of up to 5% by weight of its initial quantity.

A disadvantage associated with this earlier process resides in the high temperatures applied, where the acetic acid commences to decompose, which means loss in acetic acid and reduced commercial efficiency of the process.

A further process for removing formic acid from mixtures thereof with one or more fatty acids containing 2 to 8 carbon atoms has been disclosed in German published specification 1,117,558, wherein the mixture is caused to flow, at about 100 to 200° C., over a catalyst formed of a noble metal belonging to group VIII of the Periodic System and deposited on an active carbon catalyst. Preferably, the starting mixture to undergo such treatment is passed over the catalyst at a rate of 0.1 to 1 gram formic acid per gram catalyst per hour. From among the noble metals that can be used to serve as the catalyst, the elements platinum, osmium and iridium have an activity 5 times as high as that of ruthenium, palladium and rhodium, and 100 times as high as that of iron, cobalt or nickel. In view of the activity of the above catalysts, the carrier is conveniently formed of active carbon which is known still further and considerably to improve the catalytic activity of the above noble metals. On the other hand, when the active carbon carrier is replaced with an aluminum oxide and silicic acid or aluminum silicate carrier, the catalytic activity of platinum, for example, will be found to have been reduced down to 5% of its initial value.

A disadvantage associated with this latter process is seen to reside in the fact that the active carbon carrier fails to withstand a simple oxidizing regeneration, which is required to be carried out at certain intervals of time, due to contamination of the catalyst by organic impurities included in the starting mixture, and that the carrier is burnt at the temperatures necessary to perform the regeneration. It has therefore been necssary heretofore to regenerate the catalyst in the presence of hydrogen at a temperature of 500° C.

The present invention now provides a catalyst which enables small proportions of formic acid present in admixture with acetic acid to be removed from such mixture substantially quantitatively by decomposition of the formic acid without any loss in acetic acid, and which can be readily regenerated by oxidation, when poisoned and inactivated.

The process of the present invention for removing small proportions of formic acid from acetic acid, which may be contaminated with further organic impurities or water, by catalytic decomposition of the formic acid, at elevated temperature by means of a noble metal catalyst deposited on a carrier, comprises passing the formic acid-containing starting mixture in vapor form, at a temperature of about 120 to about 220° C., over silicic acid coated with palladium, gold and sodium acetate, the silicic acid being used as the carrier for the other catalyst components mentioned above.

In accordance with a special feature of the present invention, the starting mixture is formed of formic acid-containing acetic acid which also contains as further impurities a low molecular weight, aliphatic carboxylic acid ester and/or an aliphatic or cycloaliphatic ketone and/or an aliphatic or aromatic hydrocarbon boiling between about 100 and 135° C. The impurities contained in the above mixture include more especially ethyl acetate, cyclohexanone, n-octane, iso-octane or toluene or mixtures thereof.

Conveniently, the formic acid is catalytically decomposed at a temperature between 150 and 200° C. At that temperature, it is ensured that the formic acid is completely decomposed, while the acetic acid and the other components of the mixture, if any, remain unaffected.

With respect to the composition of the catalyst, it is an unexpected result that palladium, known to catalyze the decomposition of formic acid, is found, upon the addition of gold and sodium acetate, to catalyze the decomposition at a considerably increased rate when silicic acid is the carrier. The activity of a catalyst so made equals that of a platinum catalyst on active carbon. A catalyst with the following composition:

| | Percent by weight |
|---|---|
| Palladium | 0.05–2 |
| Gold | 0.05–1 |
| Sodium acetate | 1–15 |

Balance: silicic acid as the carrier has been found suitable for use under practical conditions.

In view of the fact that only limited quantities of formic acid can be passed over the catalyst per unit of time, it is advantageous to flow the starting mixture over the catalyst at a rate of 0.1 to 2 grams formic acid per gram catalyst per hour. The catalyst used in accordance with the present invention is conveniently produced by first impregnating the silicic acid carrier with an aqueous solution of palladium chloride and auric chloride and thereafter evaporating the resulting mixture to dryness. The catalyst so pre-treated is reduced by means of hydrazine hydrate, washed with water until free from hydrazine hydrate, thereafter treated with an aqueous sodium acetate solution, and ultimately dried at a temperature of 200° C. A completely active catalyst is obtained.

As mentioned above, the activity of the catalyst is found to decrease after prolonged use, due to the presence of catalyst poison in the form of the impurities included in the starting mixture. This can readily be determined when the quantity of formic acid decomposed is found to be less than 99%. The catalyst then calls for regenerating treatment which can readily be achieved by passing oxygen or air over it at a temperature of 400 to 500° C. The catalyst, regenerated by oxidizing it, is advantageously subjected to an after-treatment by means of hydrazine hydrate and sodium acetate solution, as already described above, to accelerate its reactivation. However, such treatment is not obligatory, and the initial catalytic activity can be restored by passing the acetic acid-containing starting mixture for a short while over the catalyst.

The advance in the art achieved by the process of the present invention is seen to reside in the fact that the novel catalyst used therein enables small proportions of formic acid to be removed quantitatively from a mixture rich in acetic acid, without decomposition of the acetic acid, and in the fact that the catalyst, when inactivated by catalytic poison, can be readily regenerated by oxidizing it. While the oxidizing regeneration has always been found to produce the desired result, irrespective of the nature of the catalyst poison, it is interesting to note that—in order to be successful—the regeneration of a customary platinum/active carbon catalyst by reducing it calls for the presence of reducible substances, which is disadvantageous.

Example 1

A mixture formed of 98% by weight acetic acid and 2% by weight formic acid was evaporated and the resulting vapors were passed continuously through a reactor heated to 185° C. and charged with a catalyst composed of:

| | Percent by weight |
|---|---|
| Palladium | 1 |
| Gold | 0.4 |
| Sodium acetate | 8.5 |

The balance being silicic acid as the carrier.

1 kg. starting mixture per kg. catalyst per hour was passed through the reactor. The formic acid was found to have been transformed quantitatively to carbon dioxide and hydrogen. The acetic acid recovered quantitatively was completely pure and found to have a permanganate time of more than 2 hours, the permanganate time being an index of the period during which a red-violet solution of 20 parts by volume aqueous acetic acid (6 parts by volume acetic acid and 14 parts by volume water) underwent no change in coloration, after addition of 1 part by volume of a 0.1% aqueous potassium permanganate solution.

Example 2

500 grams/hr. of a mixture formed of 90% by weight acetic acid, 5% by weight water, 1.5% by weight formic acid, 2.5% by weight ethyl acetate and 1% by weight cyclohexanone, was freed from formic acid in a manner analogous to that described in Example 1. The mixture recovered was analyzed. More than 99% of the formic acid initially present and 2% of the cyclohexanone were found to have been decomposed, whereas acetic acid and ethyl acetate were recovered quantitatively.

Example 3

A mixture formed of 95% by weight acetic acid and 5% by weight formic acid was freed from formic acid, at a temperature of 150–160° C., in a manner analogous to that described in Example 1. The starting mixture was passed over the catalyst at a rate of 4 kg./hr. per kg. catalyst, corresponding to a rate of 0.2 kg./hr. formic acid, referred to the content of formic acid in the starting mixture. 98% of the formic acid was decomposed under these conditions without any loss in acetic acid.

We claim:

1. In the process for removing small proportions of formic acid from acetic acid by catalytic decomposition of the formic acid, at elevated temperature, by means of a noble metal catalyst deposited on a carrier, the improvement which comprises passing a starting mixture of acetic acid with formic acid, in vapor form, at a temperature of about 120 to about 220° C., over silicic acid coated with palladium, gold and sodium acetate, the silicic acid being used as the catalyst carrier.

2. A process as claimed in claim 1, wherein the starting mixture is formed of formic acid-containing acetic acid which also contains as further impurities at least one member selected from the group consisting of organic impurities and water.

3. A process as claimed in claim 1, wherein the starting mixture is formed of formic acid-containing acetic acid which also contains as further impurities at least one member selected from the group consisting of a low molecular weight, aliphatic carboxylic acid ester, an aliphatic ketone, a cycloaliphatic ketone, an aliphatic hydrocarbon and an aromatic hydrocarbon boiling between about 100 and 135° C.

4. A process as claimed in claim 3, wherein the starting mixture is formed of formic acid-containing acetic acid which also contains as further impurities at least one member selected from the group consisting of ethyl acetate, cyclohexanone, n-octane, iso-octane and toluene.

5. A process as claimed in claim 1, wherein the starting mixture is passed over the catalyst at a temperature of 150 to 200° C.

6. A process as claimed in claim 1, wherein the carrier is coated with 0.05–2% by weight palladium, 0.05–1% by weight gold and 1–15% by weight sodium acetate, referred to the weight of the carrier.

7. A process as claimed in claim 1, wherein the starting mixture is passed over the catalyst at a rate of 0.1 to 2 grams formic acid per gram catalyst per hour.

References Cited

UNITED STATES PATENTS 3,384,659  5/1968  Bate _____ 260—541

LORRAINE A. WEINBERGER, Primary Examiner.

V. GARNER, Assistant Examiner.

U.S. Cl. X.R.

260—541